July 18, 1967  S. C. HETH ETAL  3,331,195
TURF GROOMER

Filed June 3, 1964  6 Sheets-Sheet 1

INVENTORS:
SHERMAN C. HETH
EVAN T. LEWIS
MARTIN RONNING
BY: Arthur J. Hansmann
ATTORNEY

FIG. 5

INVENTORS:
SHERMAN C. HETH
EVAN T. LEWIS
MARTIN RONNING

United States Patent Office 3,331,195
Patented July 18, 1967

3,331,195
TURF GROOMER
Sherman C. Heth and Evan T. Lewis, Racine, Wis., and Martin Ronning, Minneapolis, Minn., assignors to Jacobsen Manufacturing Company, Racine, Wis., a corporation of Wisconsin
Filed June 3, 1964, Ser. No. 372,156
8 Claims. (Cl. 56—24)

This is a continuation-in-part of U.S. patent application Ser. No. 257,010, filed Feb. 7, 1963, now abandoned. This invention relates to a lawn working machine, and more particularly it relates to a machine for the dual purpose of lawn thatching and the pickup of material such as grass, leaves, debris and the like.

Lawn thatching and pickup machines are generally known, and one disclosure thereof is shown in U.S. Patent No. 3,221,593. These machines generally consist of a frame and housing unit for traversing the ground and having a rotor which has ground engaging implements for the dual function of cutting the turf and picking up the grass clippings, leaves, and debris which are loosened by the blades and brushes serving as the ground engaging implements. Thus, with a single machine, a lawn can now be thatched and raked to condition the lawn in a beneficial and yet speedy and efficient manner.

It is therefore now recognized that good lawn care requires the thatching of the lawn wherein the grass shoots and stolons at the soil surface should be cut, and also the soil itself should be aerated, also entwined grass roots should be cut in the soil, and dead grass clippings should be removed from the soil surface. The aforementioned conditions are conducive to the development of fungus and the stifling of full and complete growth of the lawn as well as an unsightly appearance of the lawn at least with respect to the portion thereof which is visible above the ground line. Still further the purpose is to remove leaves and fresh grass clippings and any and all debris from the lawn so that again the grass itself has the best conditions for development and growth. Also, unless the lawn is conditioned as mentioned, air, moisture, and even fertilizers are stopped at the surface and do not give the turf the needed elements for healthy growth.

Accordingly, it is a general object of this invention to provide an improved machine for the dual purpose of lawn thatching and the pickup of leaves, grass clippings, debris and other material on the lawn, and with the machine being readily convertible between these functional positions, by having the machine bi-directionally movable over the ground.

A more specific object of this invention is to provide a machine which will accomplish the aforementioned services and which is specially arranged for the function of thatching, and which is also specially arranged for the function of picking up material, and with the entire machine being relatively simple in its construction and being arranged for maximum efficient operation in both functions while utilizing substantially the same parts in the machine for each function but with the parts being disposed in different positions and utilized in different directions depending upon the function performed. In accomplishing this particular object, the machine is readily convertible between the thatching position and the material pickup position.

Still another object of this invention is to provide a combined thatching and material pickup machine which provides a positive manner for directing and controlling the movement of the thatch and material through the machine so that the machine will be complete and efficient in its operation.

Still another object of this invention is to provide a thatching machine which will perform the thatching function with a minimum of disturbance to the entire lawn and the subsoil, but which will of course yet adequately thatch the soil and the grass as desired. In the specific accomplishment of this object, it is to be hereinafter more fully appreciated that the rotor of the machine is operative in a direction so that the thatching blades come out of the soil in a line where the soil has already been cut.

Another object of this invention is to provide a lawn thatching and material pickup machine with an articulated housing for riding in air-tight relation over irregular ground, and with the rotor being adjustable by itself and through the adjustment of the housing to provide selective penetration and contact pressure of the ground by the rotor implements.

Still another object of this invention is to provide a machine for material pickup such as leaves, dead grass, debris and the like, and to have the rotor operate in a direction which is counter to a direction of rolling contact with respect to movement of the machine so that the material is most completely picked up and most efficiently conveyed through the machine as desired.

Still a further object of this invention is to provide a lawn working machine which is provided with implements for engaging the lawn and wherein the implements are adjustable in their mounting on the machine for selective pressure and depth of lawn engagement, and wherein the entire machine is vertically adjustable for selective contacting of the lawn by the implements. In this particular object the individual implements are therefore adjustably extendable for lawn contact, and also the entire sets of implements are vertically adjustable for selective contact with the lawn as a unit.

Still a further object of this invention is to provide a lawn working machine which has provisions for controlling the air flow into and through the machine and with the control being such that the air flow is sufficiently strong to adequately convey the material through the machine as desired.

Still a further object is to provide a lawn working machine which can be towed in either direction along its longitudinal axis, for the respective functions of lawn thatching and material pickup, and the discharge is always rearwardly of the machine.

Other objects and advantages become apparent upon reading the following description in light of the accompanying drawings, wherein:

FIG. 6 is an exploded view of the machine showing certain parts thereof, with the front plate broken away.

Figure 1:
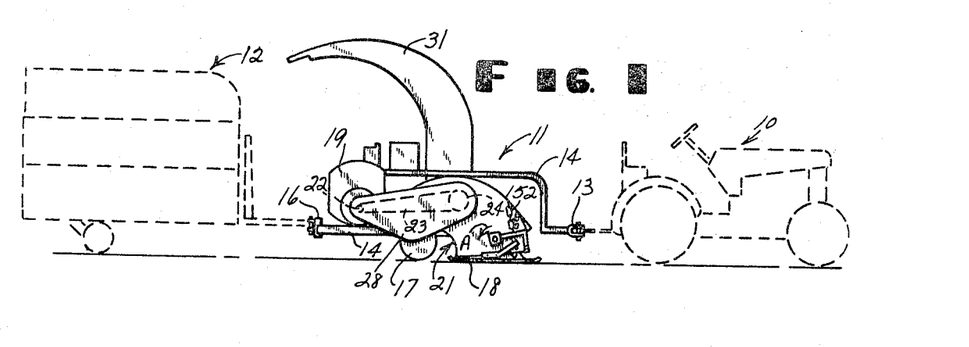
FIG. 1 is a side view of a preferred embodiment of this invention and showing a tractor and a wagon in dotted lines.
Figure 2:
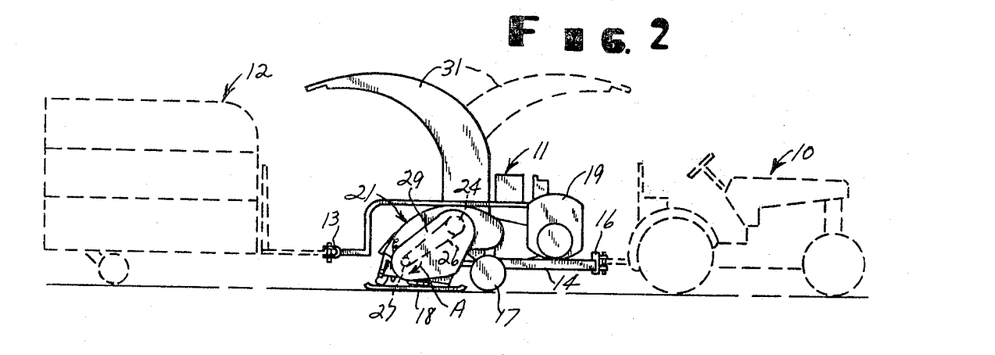
FIG. 2 is a view of the embodiment shown in FIG. 1 but shown from the side opposite thereto, and with the spout also shown in dotted lines.

FIGS. 1 and 2 show a tractor in dotted lines and generally designated 10, the machine of this invention in solid lines and generally designated 11, and a trailing wagon in dotted lines and generally designated 12. Immediately, it will be noted that the machine 11 has one hitch 13 at one end of its frame 14, and it has another hitch 16 at the other end of its frame 14. Therefore it will be understood that the frame 14 includes the members so designated, and a wheel 17 and other ground engaging members in the form of skids 18 movably support the machine along a line of direction or the longitudinal axis of the machine in of course the direction of the movement of the tractor 10. The machine further includes the engine 19 and the air hood or housing 21, both of which are suitably supported on the frame 14 in any manner known to one skilled in the art. Accordingly, the machine 11 can be towed or moved in either direction toward and by the tractor 10, and the position shown in FIG. 1 is the leaf and other material pickup position of the machine 11 while the position shown in FIG. 2 is the thatching position with respect to the direction of movement of the machine to the right in both FIGS. 1 and 2.

Figure 5:
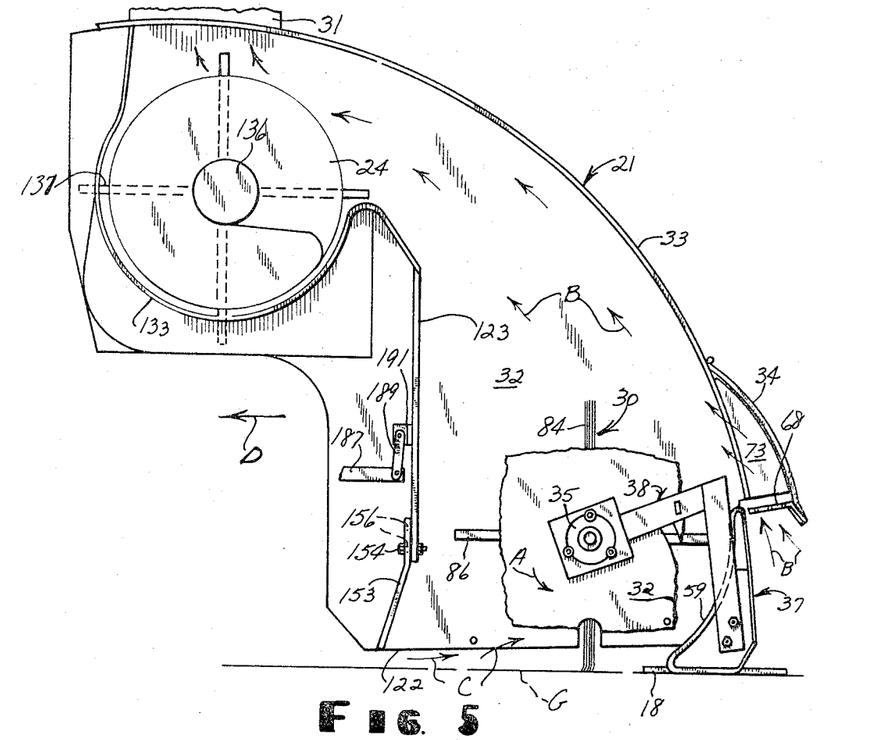
FIG. 5 is an enlarged longitudinal sectional view through the machine and showing it in the thatching position.

Further the machine 11 generally includes the engine shaft designated 22 and the drive belt 23 extending from the shaft 22 to an auger designated 24. Thus the engine 19 is a power means for the auger 24 which is also shown in FIG. 5. FIG. 2 shows that the opposite side of the machine has another belt 26 which extends from the auger down to a shaft designated 27 which is the rotor shaft shown in FIG. 7. Thus the engine 19, FIG. 1, drives the auger 24 and the rotor shaft, FIG. 2, with the latter being driven in the direction of the arrow indicated A. A suitable housing 28 encloses the drive means 23 on one side of the machine, and a suitable housing 29 encloses the drive means 26 on the other side of the housing 21 and machine 11. Also a spout 31 is swivelly mounted on the top of the machine 11 as a part thereof, and the spout can swivel in a complete circle to be directed in both the solid line position and the dotted line position in FIG. 2. Thus of course in both instances the spout 31 is directed at the wagon 12 so that the thatch and material picked up by the machine will of course be directed into the wagon if it is desired to use a wagon 12, instead of retaining the material in the machine.

Therefore it will be understood that the machine is powered by an engine to have a rotor 30 rotate in one direction only while the machine is towed over the ground by the tractor 10. Thus the rotor operates on the turf for the purpose of thatching or material pickup in a manner described hereinafter.

The housing 21 is an air hood, which is rockably supported, and it includes the side walls 32 and the transverse wall 33. The latter has a cover 34 attached thereto by means of a hinge 36 so that the cover can of course be raised from the position shown, and the housing interior is then accessible for adjustment and the like with respect to the rotor 30. Thus, the walls 32 and 33 extend down toward the ground, and the cover 34 is spaced further above the ground, and the space is occupied by a baffle generally designated 37 and supported on the housing 21 by means of the adjusting mechanism generally designated 38. Also, ground engaging members in the form of the skids 18 are mounted on the housing 21, and FIG. 4 particularly shows that the baffle 37 rests downwardly on the skids 18, and this is the thatching position of the machine. Thus the skid end 39 is disposed toward the interior of the machine, and the baffle 37 has a notch 41 which receives the skid end 39 and permits the baffle lower surface 42 to depend to the ground line to slide along the ground in the operation of the machine.

The member 38 supports the baffle 37 by being rotatably mounted through a collar 35 on each side of the housing 21 by means of the bolts 43. The plate 44 is thus rotatable adjacent the wall 32 by the washers 46 which slidably secure the plate 44 to the wall 32. A first arm 47 extends from the plate 44 to a second arm 48 which extends downwardly and connects to the baffle 37 by means of the two bolts 49 as shown. A block 51 suitably extends between the arm 48 and the side 52 of the baffle 37. Accordingly, the baffle 37 is vertically adjustably mounted for the floating action on the housing 21. Also a counterbalancing spring 53 is connected to a bracket 54 on the arm 47 and a bracket 56 on the housing 21 to support the entire assembly including the baffle 37 in an upward direction so that all of the weight is not downward on the skid 18. In fact only about ten pounds of the weight is on the skid and this is an adequate amount to retain the baffle 37 downwardly on or adjacent the ground as desired. Thus the counter-weight spring 53 has a rod 57 which is adjustable on the bracket 56 by means of the nut 58 so that the pressure of the spring 53 can be adequately controlled for supporting the part of the weight of the assembly of elements 37 and 38 as described.

FIG. 6 shows the exploded view of the construction of elements 37 and 38, and it shows the baffle 37 to include the arcuate plate 59 and the upturned lower portion 61 which receives a sliding boot 62 by means of the bolts 63 and the boot 62 is secured to the lower portion 61. Also a front plate 64 is secured to the curved plate 59 by means of bolts 66.

FIG. 6 further shows the hinged cover 34 and the hinge 36 which is secured to the housing wall 33 by means of the bolts 67. Also, the cover 34 has a perforated plate 68 attached to the lower lip 69 by means of a support plate 71 and the bolts 72. The perforated plate 68 is best shown in FIG. 5 to serve as an air filter for the flow of incoming air created by the rotor described later, and it is a safety guard for the operator.

Figures 3, 4:
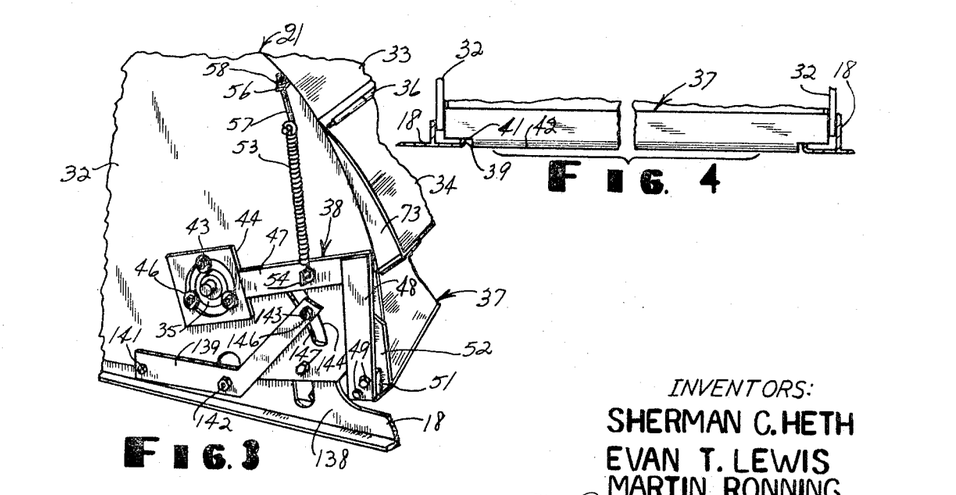
FIG. 3 is an enlarged perspective view of a fragment of the embodiment shown in FIG. 1 with parts removed, and other parts added.
FIG. 4 is a front elevational view of the embodiment shown in FIG. 3 and showing a fragment thereof and parts broken away, removed, and added.
Figure 3:
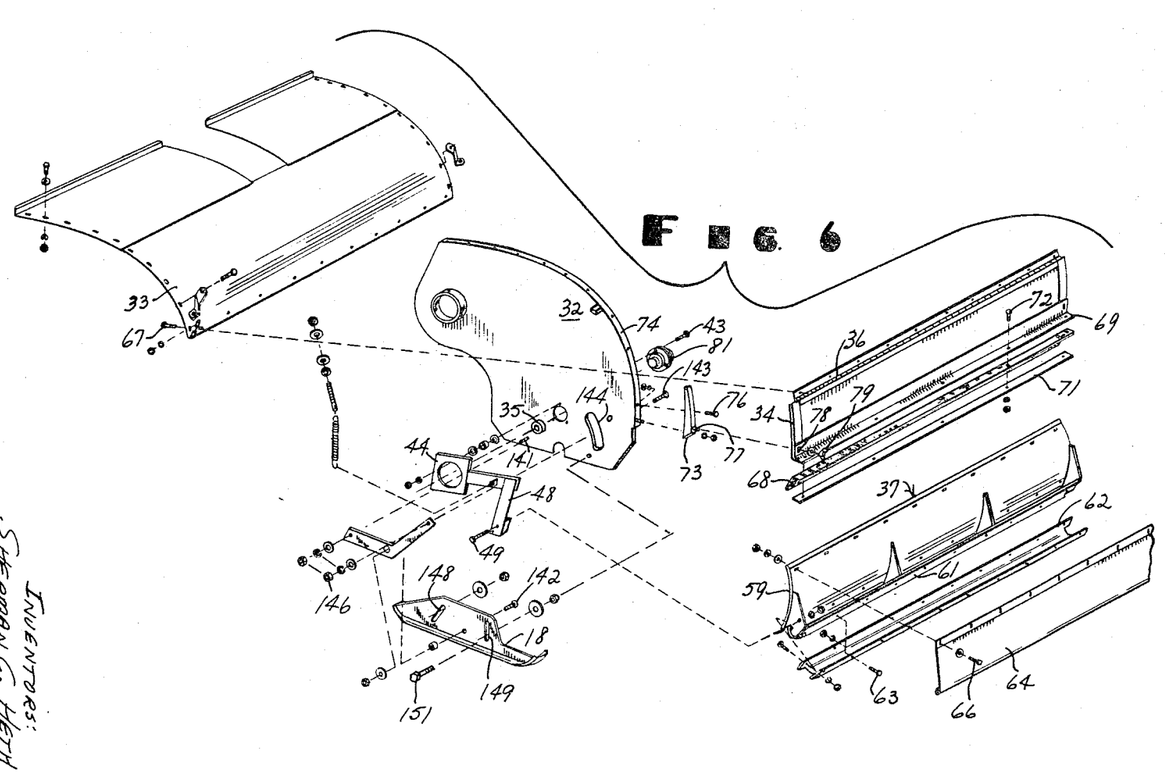

FIG. 6 also shows a block 73 attached to the edge 74 of the side wall 32 by means of bolts 76, and the block 73 supports the cover 34 in the partially open position shown in FIGS. 3 and 5. A bolt or stud 77 extends from the block 73 and to an opening 78 in the cover 34, and a wing nut 79 threads on the stud 77 to secure the cover 34 in the operating position shown. Of course when it is desired to have access to the interior of the housing 21 then the wing nut 79 on each end of the cover 34 may be removed and the cover 34 can be swung about its hinge 36 and this purpose of access will be more apparent hereinafter.

FIG. 6 further shows a bearing 81 which is mounted on the side wall 32 by means of the bolts 43, and the bearing supports the rotor shaft 27. At this time it will therefore also be noted that the baffle 37 is swingable about the rotor shaft 27 because of the mounting of the support member 38. Thus FIG. 5 shows the arcuate portion 59 of the member 37 curved about the axis of the rotor shaft 27. Collar 35 is on the bearing 81.

Figure 7:
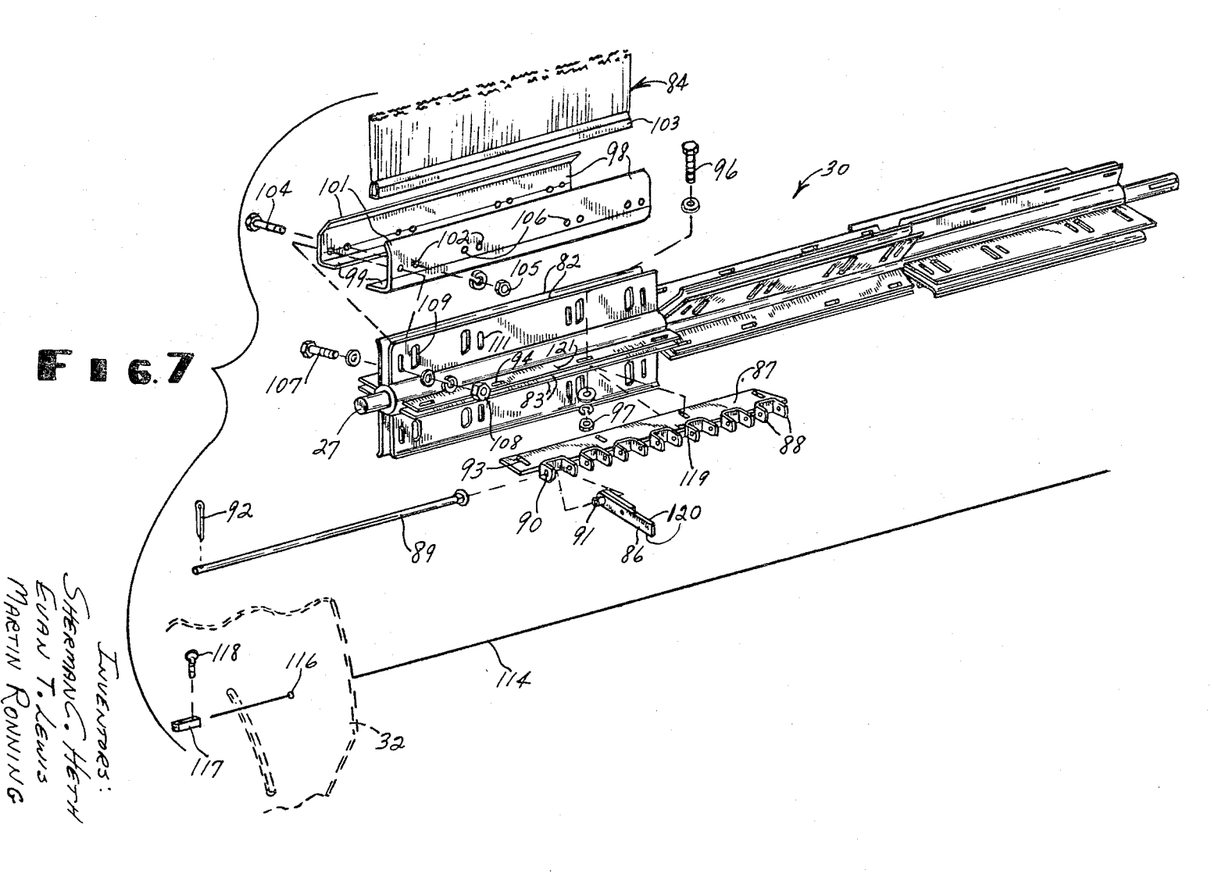
FIG. 7 is an exploded view of the rotor of the machine shown in FIG. 5 and showing a side of the machine in dotted lines and showing a gauge wire.

FIG. 7 shows the rotor with the shaft 27 extending therethrough. Pairs of plates 82 and 83 are suitably attached to the shaft 27 by welding or the like to extend radially therefrom in diametrically opposite pairs as shown. It will also be noted that the plates 82 and 83 are radially offset in three groups along the length of the shaft 27 and thus the load on the shaft and the rotor as a whole is distributed along and in the nature of phases of rotation of the rotor when the implements hereinafter described are in engagement with the ground.

Thus a plurality of brushes, such as the brush 84, and a plurality of knives or blades, such as the blade 86, are radially extended on the rotor for the working purpose hereinafter mentioned. Of course it will be understood that the blades 86 exist in a set on the support plate 87 which secures a plurality of U-shaped members 88 suitably attached to the plate 87. Also a bolt 89 extends through openings 90 in the members 88 and openings 91 in the blades 86 to thereby secure the blades to the members 88. A cotter pin 92 is employed for securing the bolt or shaft 89 with respect to the members 88 and therefore the shaft 89 can be readily withdrawn from the members 88 and any one or all of the blades can be removed. It will also be noted that the plate 87 has radially elongated slots 93 extending therethrough and these slots align with axially elongated slots 94 in the two members 83 on the shaft 27. Finally, bolts 96 and nuts 97 secure the plates 87 to the plates 83. With this arrangement it will therefore be noted that the connection between the blades 86 and the shaft 27 is such that the blades can be adjustably positioned both axially and radially with respect to the shaft 27.

The brushes 84 are secured to the shaft 27 by means of the clamping plates 98 which have inturned ends 99 on the radially inner edges thereof and inturned ends 101 on the radially outer edges thereof. Also a set of bolt holes 102 is provided in each of the plates 98, and the plates flank the brush 84 and particularly the brush crimping strip 103. Thus the brushes 84 are of course clamped by the plates 98 when the bolts 104 with nuts 105 are tightened on the plates 98.

Figure 8:
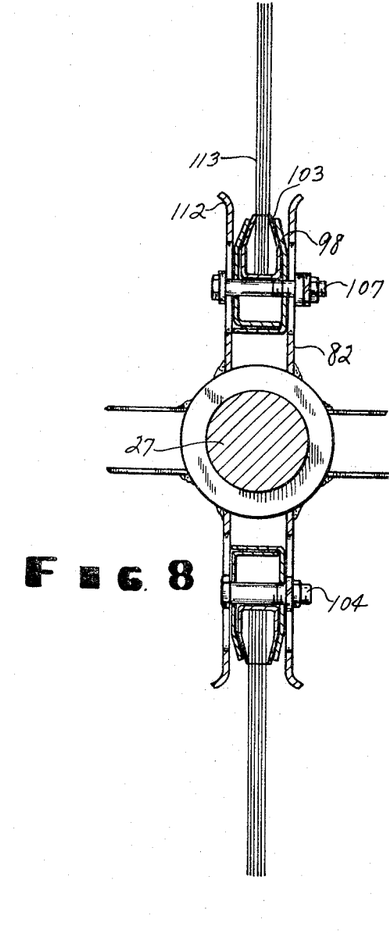
FIG. 8 is a sectional view transverse to the rotor shown in FIGS. 5 and 7 and being enlarged therefrom and having parts broken away, and with parts added in accordance with FIG. 7, and with the section being taken on the line 8—8 of FIG. 9.

FIG. 8 shows the assembled arrangement of the parts described.

Figure 9:
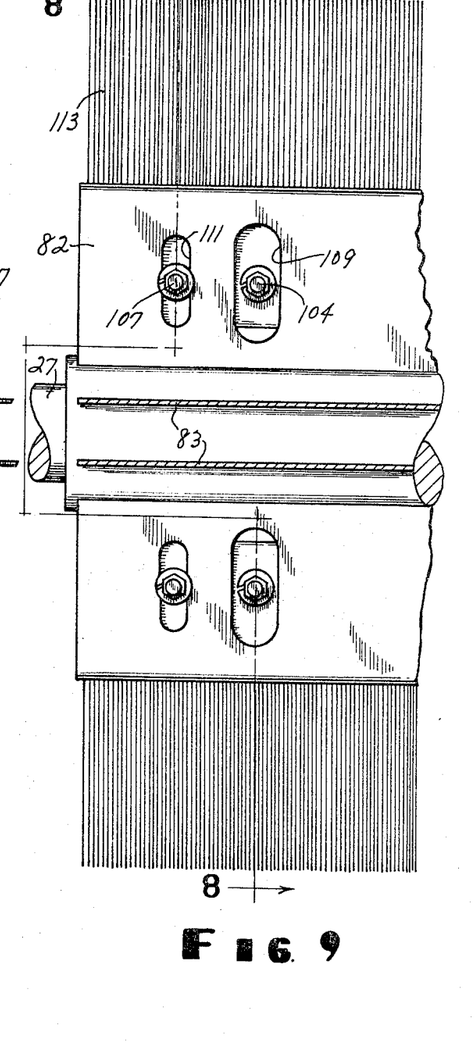
FIG. 9 is a side elevational view of that shown in FIG. 8.

Also, the subassembly described is disposed between the attaching means or plates 82, and a second set of bolt holes 106 is disposed in the plates 98 to receive bolts 107 which are secured by the nuts 108 to bolt the brush assembly to the plates 82. Of course in both instances of bolting, radially elongated slots 109 and 111 exist in both the plates 82 for reception of the bolts 104 and 107 respectively. Again FIGS. 8 and 9 show the assembled arrangement of the brush parts described. Also it will be noted that the outer edges 112 of the plate 82 are turned outwardly away from the brush so as not to interfere with the brushing action of the brush when the latter is normally displaced in its brushing action but the edges 112 are available for supporting the bristles 113 of the brushes 84 if needed. This brush sub-assembly with the brush 84 and the plates 98 is radially adjustably movable with respect to the shaft 27.

FIG. 7 further shows a gauge wire 114 or the like extends through an opening 116 in the side wall 32 and is secured thereto by a block 117 and a wing screw 118. The gauge wire 114 is therefore stretched between the two sides 32 of the housing 21 and provides the alignment guide for the radial projection of the brushes 84 and the blades 86 so that they can be both aligned radially to the same extent or they can of course be disposed radially to an extent desired since the blades and the brushes are independently radially adjustable.

Also, the blade plate 87 has a gauge mark indicated 119 and plate 83 has a gauge mark indicated 121, and these marks are used for axial alignment of the blade plate 87 with respect to the shaft 27. Therefore the individual blades 86 on diametrically opposite sides of the shaft 27 can be placed in the same axial alignment so that each blade operates in the same transverse plane with respect to the rotor and they therefore operate in the same line of cut as desired. Thus, upon thatching, lines of cuts are formed in the ground as the machine advances, and the blades 86 are rotated to enter uncut soil but to come out of the soil where there is a cut, and cutting edge 120 is shown.

FIGS. 2 and 5 show the machine in the thatching position, and it will here be noted that the baffle 37 is down adjacent the ground line indicated G in FIG. 5. In this position, the baffle 37 serves to receive thatch, leaves, dead grass, and the like which would be thrown and blown by the rotor against the arcuate surface 59. Also, the baffle 37 serves as an air shield so that air flows according to the arrows indicated B as the air flows past the perforated plate 68 and as it flows according to the arrows indicated C because of the counter-clockwise rotation of the rotor as shown in FIG. 5. The air flow therefore of course carries the material up through the housing 21 as the material is guided by the sides 32 and the wall 33 and an inner wall 123. The housing 21 has its upright walls 32 terminated in lower edges 122 spaced above the ground G. The skids 18 then extend across the space and to the ground. Also, the transverse housing walls 33 and 123 are also spaced above the ground, and the baffle 37 extends from the wall 33 to the ground, just as a baffle extends on the other housing wall 123 to the ground. The skids 18 and the baffles are vertically movable in accordance with the ground to air seal with the housing at all times. Thus the entire machine vertically adjusts itself according to the ground on which it is operating, and the baffle means, including baffle 37, is arranged to pivot upwardly if it engages an obstacle on the ground and such pivot is anticipated by the skids 18 which extend in the forward direction from the baffle 37.

Of course in the operation shown in FIG. 5, the entire machine is moving in the direction of the arrow indicated D. Thus the material is conveyed or blown up to a trough 133 suitably mounted in the housing 21 which also supports the auger 24 on an auger shaft 136 rotatably mounted in the housing 21. The auger conveys the material from the outer wall 32 to the center plane of the auger where paddle wheels or like blades 137 receive the material and impel it upwardly to the chute 31 and out from the machine much in the well-known manner of an auger and an impeller, and also as shown in the U.S. Patent 3,112,593 with respect to its auger and impeller blades.

The material picked up and displaced by the rotor is therefore impinged against the baffle 37 to place the material in the air stream described. FIG. 4 shows the support of the baffle 37, and it also shows the housing sides 32 disposed intermediate the upright portion 138 on the skids 18 and the ends of the baffle 37. Therefore the skid portions 138 serve to seal off the sides of the machine as they extend beyond the lower edges of the housing walls 32 and down to the ground to provide the air tight construction so that air flow as described can be accomplished.

The housing 21 is vertically adjustably supported on the skids 18 by means of the adjustable connector 139 which is pivotally mounted on the housing wall 32 by the bolt 141. Thuus the member 139 is also attached to the skid 18 by the bolt 142 and it is adjustably attached to the housing wall 32 by the bolt 143. FIG. 6 shows the bolt or stud 141 on the wall 32, and it shows the bolt 143 extending through an arcuate slot 144 in the wall 32 to be connected to the member 139 by the nut 146. Still further, a scale 147 is disposed on the wall 32 adjacent the arcuate opening 144, and it will therefore be understood that upon loosening the nut 146 the member 139 can be pivoted about the bolt 141 to an adjusted position with respect to the slot 144. In this adjustment, the bolt 142 raises or lowers the skid 18 as desired. FIG. 6 shows that the bolt 142 of course also connects to the skid 18 as well as to member 139.

The skid 18 has two upright slots 148 and 149 which respectively receive the bolts 141 and a bolt 151, both of which are secured to the side 32. Thus the skids 18 are able to pivot about the bolts 142 to adjust for changes in the ground traversed by the machine.

In the FIG. 1 position, the machine is in the leaf and material pickup position, and in this position the baffle 37 is supported upwardly by means of a chain 152 which is secured to the housing 21 and depends therefrom to hook onto the member 38 and maintain the baffle 37 upwardly as mentioned. Therefore the machine does not have the lower boot 62 of the baffle 37 riding on the material to be picked up, but instead the baffle 37 is raised to just a height to clear the material, such as leaves, and thus the brushes can adequately engage and pick up the material. It is significant to note that in the FIG. 1 position the rotor is rotating in the direction of the arrow indicated A and therefore the brushes are sweeping up under the material and directing it toward the raised baffle 37 and into the air stream as mentioned in connection with FIG. 5. Also, the machine would be moving in the direction of the tractor 10 and any material which is not impinged against the baffle 37 and immediately picked up by the machine will be moved forwardly with respect to the movement of the machine and it will simply then be subsequently picked up as the machine advances and the rotor again engages the material.

It will therefore be understood that the housing 21 is disposed to have its lower edges terminate adjacent to but spaced from the ground G as in FIG. 5 for instance. Then the skids 18 are related in an air-sealing relationship to the housing sides 32, and the baffle is also so related so that of course the skids and the baffle extend from the lower edge of the housing 21 to the ground G. Further, FIG. 5 shows a second baffle 153 which is attached by means of a bolt 154 to the housing wall 123. The baffle 153 is of a flexible material such as leather or the like so that it can of course engage obstacles and irregularities on the ground and simply ride over them. The member 153 of course extends between the sides 32 to form an enclosure of the housing 21 with respect to its walls described and with respect to the ground. Further it will be noted that the member 153 has two sets of openings 156 along the top portion thereof for receiving the bolts 154. Therefore the member 153 is vertically adjustable on the wall 123 so that the member 153 can be placed in an upper position as shown, and this is a position used in thatching, and it can also be placed in a lower position when the upper set of bolt holes 156 is aligned with the bolts 154, and this is then the leaf pick-up position. Thus the baffle 153 in the shown position which is the raised position, does not ride on the lawn when the machine is moving in the direction of the arrow indicated D. Thus the baffle 153 does not interfere with the material to be thatched and picked up from the lawn, and likewise, when the machine is moving in the opposite direction for leaf and other material pick-up, when the member 153 can be and is placed in the lower position so that it can actually engage the lawn and brush the material into the reach and control of the rotor 30 as the latter creates its air stream and physical pick-up of material, and this would of course be significant with respect to material which is not initially conveyed through the machine by the air stream B but may be passed by the machine but will nevertheless be ultimately picked up because of the presence of the baffle 153.

Figure 10:
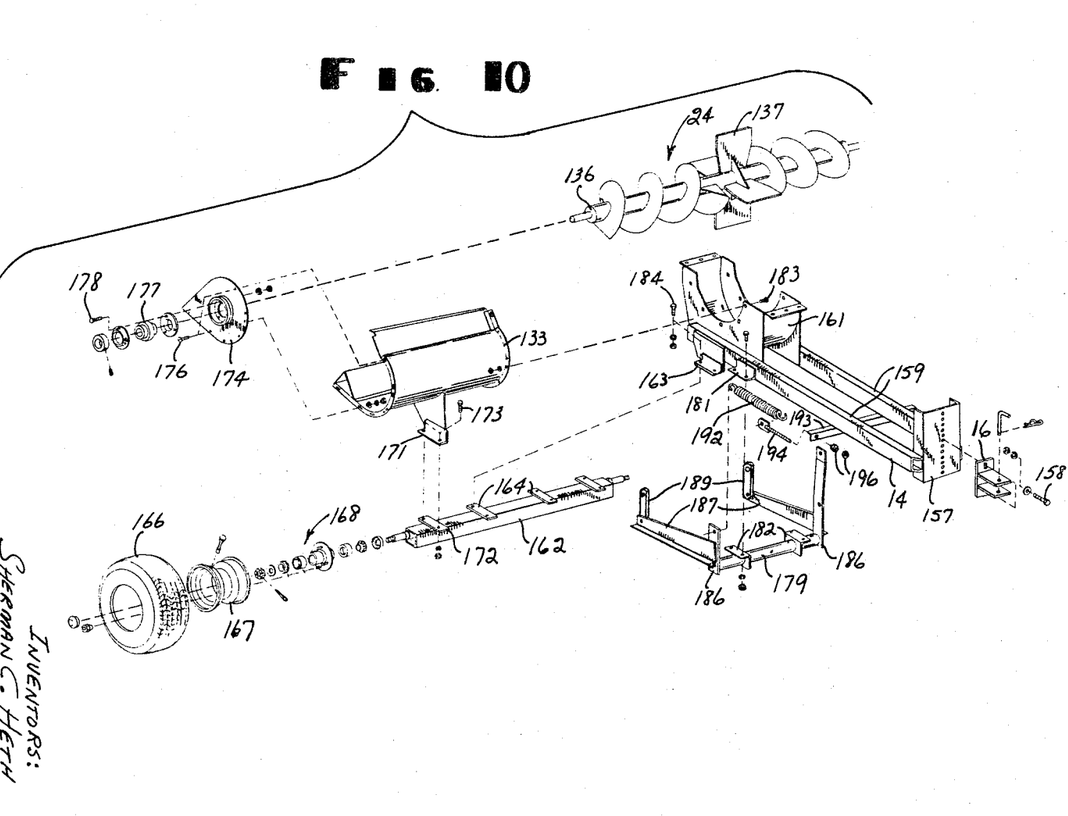
FIG. 10 is an exploded view of certain parts of the machine.

FIG. 10 more particularly shows the rockable or articulate mounting of the housing 21 with respect to the machine frame 14. Here it will be seen that the hitch 16 is secured to a frame plate 157 by means of the bolts 158. Horizontally disposed frame tube members 159 extend longitudinally of the machine and support the auger center housing 161, which is fixedly attached to the members 159. Also, the wheel axle 162 is secured to the members 159 by means of brackets 163, suitably attached to the members 159, and the plates 164 suitably attached to the axle 62. Of course the machine wheel is shown to include the tire 166, the rim 167 and the bearing assembly generally designated 168, all of which are supported on the axle 162 in the well-known manner.

Also rigidly attached with respect to the frame 14 is the auger trough and housing portion 133. This attachment is by means of the bracket 171 on the housing 133 and the plate 172 on the axle 162, both being attached together by bolts such as the bolt 173. The axle 162 of course intervenes and provides the rigid and physical attachment between the frame 14 and the auger housing portion 133.

The auger 24 is also shown with its shaft 136 and its central blades 137, and the auger is rotatably mounted on the housing portions 133 and 161 by an end plate 174 which is secured to the outer end of the auger housing 133 by means of bolts such as the bolt 176. The plate 174 carries a bearing 177 secured thereto by bolts such as the bolt 178, and the bearing 177 of course rotatably supports the auger 24 on both ends of the shaft.

The final portion of the machine which is fixedly connected to the frame 114 is the rock shaft 179 which is connected to the frame brackets 181 by means of brackets 182 on the shaft 179 in a fixed relation thereto. Of course bolts 183 secure the two brackets together, just as bolts 184 secure the bracket 163 to the axle plate 164.

Upright plates or standards 186 are disposed on opposite ends of the rock shaft 179 and are rotatable with respect thereto and have angle members 187 extending from the plates 186. The ends of the members 187 have links 189 which attach to the housing 21 to thereby provide the articulate or vertical movement of the housing 21 with respect to the frame 14 and the remainder of the machine since the members 187 are rockable on the shaft 179 as mentioned.

Thus FIG. 5 shows the member 187 extending to the housing 21 and being flexibly connected thereto by means of a link 189 which is in turn pivotally connected to a bracket 191 fixed on the housing wall 123. Thus the members 187 are connected to the housing wall 123 in a somewhat articulated manner so that the vertical pivotal movement of the members 187 likewise vertically displaces the bracket 191 and therefore the housing 21.

A counter-balance tension spring 192 is also shown in FIG. 10 and connects between the plate 186 and the frame 14 through the projection 193 on the frame. An adjustable screw 194 and nuts 196 actually intervene between the spring and the bracket or projection 193 so that the housing can be counter balanced on the frame in an adjustable sense so that adequate downward pressure of the housing is controllable. Therefore, FIG. 5 shows that the housing tends to depend in a clockwise direction about the rotor shaft 136, and the spring 192 of course operates in the counter-clockwise direction to support the overhanging weight of the housing 21 to an extent desired, by the adjusting screw 194.

What is claimed is:

1. A lawn thatching and leaf pick-up machine, comprising an air hood movable along a path of travel and including walls extended in spaced relation to the ground, skids movably attached to opposite ones of said walls of said air hood and extending therefrom to the ground and supporting said air hood on the ground and extending beyond said air hood along the path of travel, an air baffle vertically movably mounted on said air hood and extending therefrom to the ground intermediate said skids for enclosing said air hood with the ground and being supported on said skids at a location substantially spaced from the extended ends of said skids to move vertically with said skids, a rotor rotatably mounted on said air hood with the axis extending in the direction between said skids and adjacent said baffle for engaging the ground in thatching and leaf pick-up and creating an air flow upon rotation of said rotor, and said air hood having an air opening therein for the entrance of air into said air hood and the conveyance of thatch and leaf material therethrough upon rotation of said rotor.

2. A machine for thatching and picking up grass, leaves, and debris from a lawn, comprising a frame, a housing supported by said frame for movement over the ground and including upright walls extending toward the ground and composing two side walls and one transverse wall intermediate said side walls spaced substantially above the ground and composing an opposing transverse wall extending adjacent the ground and with said housing being open at the lower ends of said walls, a rotor rotatably mounted in said housing and extending across the lower open end of said housing and including ground-engaging implements for sweeping and picking up material on the ground upon rotation of said rotor, ground engaging skids connected to said housing at said side walls and extendnig down to the ground for slidably supporting said housing on the ground, means operatively connected to said rotor for rotating the latter in one direction, a baffle member supported on said housing and disposed parallel to the axis of said rotor and adjacent the rotational path of said implements and located to span the space between said one wall and the ground and disposed with respect to said rotor in the path of the material swept by said rotor to baffle the material picked up and moved by said implements, said baffle member being vertically movably supported on said housing, tension means operatively connected between said housing and said baffle member for vertically counterbalancing the latter, said baffle member being spaced from said one wall to form therewith an air inlet at a level spaced above said lower ends of the other of said walls and above the level of the upper edge of said baffle member for the introduction of air into said housing, and means for creating an air flow through said inlet and said housing to move the picked up material through said housing.

3. A lawn thatching and leaf pick-up machine, comprising a frame, an air hood vertically movably mounted on said frame and including upright walls extending toward the ground and composing two side walls and one transverse wall intermediate said side walls spaced substantially above the ground and composing an opposing transverse wall extending adjacent the ground and with said housing being open at the lower ends of said walls, skids vertically adjustably attached to and being in overlapping contact along the entire lengths of said side walls of said air hood for air-sealing relation with said side walls and extending therefrom to the ground and supporting said air hood on the ground, air baffles vertically movably mounted on said air hood and extending therefrom to the ground intermediate said skids for enclosing said air hood with the ground, a rotor rotatably mounted on said air hood with the axis extending in the direction between said skids for engaging the ground in thatching and leaf pick-up upon rotation of said rotor, one of said baffles being spaced from said one wall to present an air opening therewith and at a level spaced above the lower edges of the other of said walls and spaced above the level of the lower edge of said one baffle for the entrance of air into said air hood and the conveyance of thatch and leaf material therethrough upon rotation of said rotor.

4. A lawn thatching and leaf pick-up machine, comprising an air hood movably mounted and including a plurality of upright walls in spaced relation to the ground and including two oppositely disposed and spaced-apart side walls and transverse walls extending between said side walls, skids vertically adjustably attached to and being in overlapping contact along the entire lengths of said side walls of said air hood for air-sealing relation with said side walls and extending therefrom to the ground and supporting said air hood on the ground, an air baffle vertically floatingly mounted on said air hood and extending from adjacent one of said transverse walls to the ground and being supported on and extending intermediate said skids for enclosing said air hood with the ground and for vertically moving with said skids and thereabove in accordance with rises on the ground, a rotor rotatably mounted on said air hood with the axis extending in the direction between said skids for engaging the ground in thatching and leaf pick-up upon rotation of said rotor, power means for rotating said rotor in the direction to move thatch and leaf material directly toward said baffle, and said air hood having an air opening above the uppermost level of said baffle for the entrance of air into said air hood above said baffle and for the conveyance of thatch and leaf material through said air hood upon rotation of said rotor.

5. A lawn thatching and leaf pick-up machine, comprising an air hood movably mounted and including a plurality of upright walls in spaced relation to the ground and composing two spaced-apart side walls and two transverse walls extending between said side walls, skids movably attached to and being in overlapping contact along the entire lengths of said side walls of said air hood for air-sealing relation with said side walls and extending therefrom to the ground and supporting said air hood on the ground, a rotor rotatably mounted on said air hood with the axis extending in the direction between said skids and including implements extended thereon for engaging the ground in thatching and leaf pick-up relation and adapted to create an air flow upon rotation of said rotor, power means for rotating said rotor, an air baffle pivotally floatingly mounted on said air hood and extending therefrom to the ground intermediate said skids and being upwardly supported on the latter for enclosing said air hood with the ground and being mounted to pivot about the axis of said rotor for vertical movement in response to rises in the ground, said baffle including an arcuate wall extending immediately adjacent the extent of said implements and being curved about said axis of said rotor, and said air hood having an air opening adjacent said baffle and above the uppermost level of said baffle for the entrance of air into said air hood above said baffle and for the conveyance of thatch and leaf material through said air hood upon rotation of said rotor.

6. A lawn thatching and leaf pick-up machine, comprising an air hood movable along a path of travel and being disposed in spaced relation to the ground, two skids vertically adjustably connected to said air hood in spaced-part relation and extending in air-sealing relation therefrom to the ground and supporting said air hood on the ground and extending beyond said air hood along the path of travel, releasable means connecting said skids to said air hood and having markings for setting the spacing of said air hood from the ground, an air baffle vertically movably mounted on said air hood and extending therefrom toward the ground intermediate said skids for enclosing said air hood with the ground and being supported on said skids at a location substantially spaced from the extended ends of said skids to move vertically with said skids, a rotor rotatably mounted on said air hood with the axis extending in the direction between said skids and adjacent said baffle for engaging the ground in accordance with the adjustment of said skids for thatching and leaf pick-up and creating an air flow upon rotation of said rotor, and said air hood having an air opening for the entrance of air into said air hood and the conveyance of thatch and leaf material therethrough upon rotation of said rotor.

7. A lawn thatching and leaf pick-up machine, comprising a frame, a combined auger and impeller rotatably supported by said frame, a spout supported by said frame and being in material-flow communication with said impeller, an air hood rockably supported by said frame about the axis of said auger and including a plurality of upright walls arranged to direct air flow up to said auger and consisting of two spaced-apart side walls and two spaced-apart transverse walls extending between said side walls, skids movably attached to said side walls of said air hood and extending therefrom to the ground and supporting said air hood on the ground, a rotor rotatably mounted on said air hood with the axis extending in the direction between said skids for engaging the ground in thatching and leaf pick-up upon rotation of said rotor and for moving air up said air hood to said auger, power means for rotating said combined auger and impeller and said rotor, a first baffle uprightly mounted on said air hood and extending parallel to said rotor between said side walls and from a position spaced away from the lower edge of one of said transverse walls and toward the ground and in the path of the material moved by said rotor, a second baffle uprightly mounted on said air hood and extending from the other of said transverse walls and toward the ground, and said air hood having an air opening at the upper end of the said first baffle as defined between the upper edge of said first baffle and said lower edge of said one transverse wall for the entrance of air into said air hood above said first baffle and for the conveyance of thatch and leaf material through said air hood and to said auger upon rotation of said rotor.

8. A machine for the dual purpose of lawn thatching and leaf and debris pickup and being movable in two directions along a longitudinal axis of said machine, comprising an air hood movably supported for movement in said two directions and including upright walls extending toward the ground and composing two side walls and one transverse wall intermediate said side walls spaced substantially above the ground and composing an opposing transverse wall extending adjacent the ground and with said hood being open at the lower ends of said walls, a rotor rotatably supported by said air hood and disposed on an axis transverse to the line of movement of said air hood, power means operatively connected to said rotor for rotating the latter in one direction only, blades and brushes both radially adjustably included in said rotor for selectively contacting the ground and moving thereacross in the direction of rotor rotation to pick up material from the ground, a first hitch connected with said air hood at one end along the line of direction of movement of said air hood and to the side of said air hood adjacent said opposing transverse wall for towing said machine in one of said two directions and relative to the rotation of said rotor for thatching with said blades rotating in the direction of rolling contact with the ground, a second hitch connected with said air hood at the other end along the line of direction of movement of said air hood for towing said machine in the other of said two directions and relative to the rotation of said rotor for leaf pickup with said brushes rotating in the direction opposite to that of rolling contact with the ground, a baffle member vertically floatingly mounted on said air hood and extending immediately adjacent both the ground and said rotor and to the rear of the latter with respect to said one direction of movement of said machine and extending in the path of said material picked up by said rotor to deflect and direct said material through said machine during thatching, said baffle member being spaced from said one wall to form therewith an air inlet at a level spaced above said lower ends of the other of said walls and above the level of the upper edge of said baffle member for the introduction of air into said hood, and means operatively connected between said air hood and said baffle member for selectively vertically supporting the latter in a set raised position away from the ground for leaf pickup.

References Cited

UNITED STATES PATENTS

| Re. 23,972 | 3/1955 | Ronning | 56—26 X |
| 1,336,065 | 4/1920 | Bowers. | |
| 2,014,321 | 9/1935 | Flynn | 172—550 |
| 2,941,347 | 6/1960 | Strom | 56—26 |
| 3,112,593 | 12/1963 | Ronning | 56—24 |

FOREIGN PATENTS 881,348   11/1961   Great Britain.

ABRAHAM G. STONE, *Primary Examiner.*

P. A. RAZZANO, *Assistant Examiner.*